Oct. 23, 1956    A. G. SPEAR, JR    2,768,024
RETRACTABLE RIGID AUTOMOBILE TOP
Filed Feb. 9, 1953    2 Sheets-Sheet 1

A. G. SPEAR, JR.
INVENTOR.

BY
ATTORNEYS

Oct. 23, 1956     A. G. SPEAR, JR     2,768,024
RETRACTABLE RIGID AUTOMOBILE TOP

Filed Feb. 9, 1953     2 Sheets-Sheet 2

A.G. SPEAR, JR.
INVENTOR.

BY

ATTORNEYS

United States Patent Office 2,768,024
Patented Oct. 23, 1956

2,768,024

RETRACTABLE RIGID AUTOMOBILE TOP

Adrian G. Spear, Jr., Southfield Township, Oakland, Mich., assignor to Ford Motor Company, Dearborn, Mich., a corporation of Delaware Application February 9, 1953, Serial No. 335,841

2 Claims. (Cl. 296—107)

This invention relates to motor vehicle bodies and has particular reference to a motor vehicle body having a retractable rigid roof.

Reference is made herein to the copending application of Spear et al., S. N. 322,604, entitled "Motor Vehicle Body," filed November 26, 1952, of which the present application is a continuation in part. The above mentioned copending application relates to a motor vehicle body having a rigid roof which may be readily lowered and stored within or upon the vehicle body, and particularly discloses a body in which the top is bodily moved from a raised position to a lowered position in which it is stored beneath the rear deck of the vehicle, the deck being automatically raised during the lowering operation to accommodate the roof after which the deck is again lowered in place. A feature of the present application is the provision of means for bodily moving the roof from its raised position to a lowered position in which it fits over and on top of the rear deck of the vehicle. The construction is such that it simulates in shape and appearance the rear deck so that when the roof is in a lowered position the vehicle has substantially a normal and pleasing appearance. The invention contemplates the use of a pair of longitudinally extending curved tracks to guide the rear portion of the roof, and levers to guide the forward portion thereof under power actuation. A further feature of the invention is a provision of a separate back light or rear window for the vehicle which is retracted into a stored position rearwardly of the rear vehicle seat simultaneously with the lowering of the roof. Consequently the roof in its lowered position is open at its rearward end, and this opening provides clearance for a luggage compartment door providing access to the spare tire and to storage space beneath the rear deck. An adequate storage space is thus provided, and the rear deck can be a fixed body panel, simplifying the construction of the body and the problem of waterproofing the luggage compartment as well as reducing the overall cost.

Other objects and advantages of this invention will be made more apparent as this description proceeds, particularly when considered in connection with the accompanying drawings, wherein.

Figure 1:
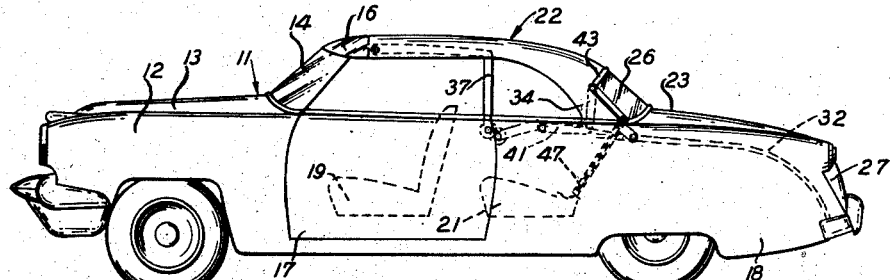
Figure 1 is a side elevational view of a motor vehicle incorporating the present invention, with the roof and back light in their raised positions.
Figure 2:
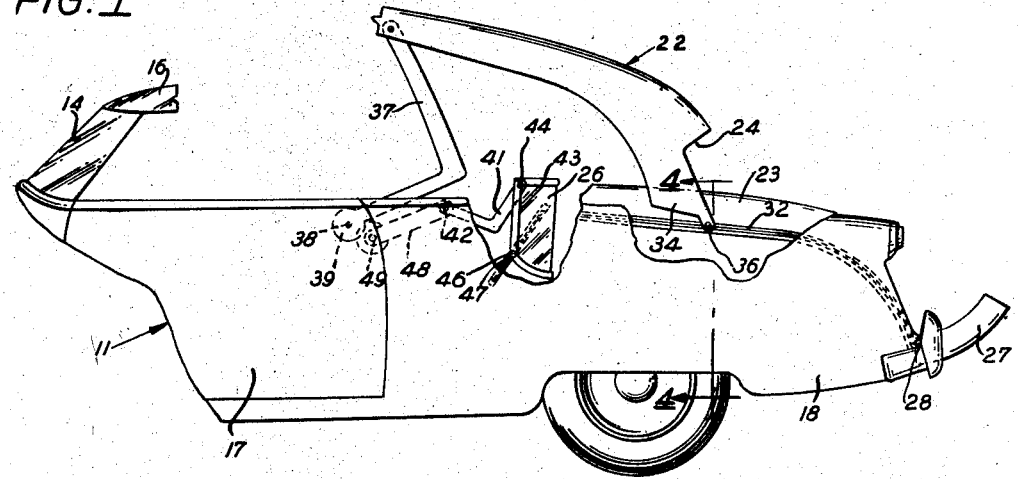
Figure 2 is a fragmentary enlarged side elevational view of a portion of the vehicle shown in Figure 1, with the roof and back light in partially lowered positions.
Figure 3:
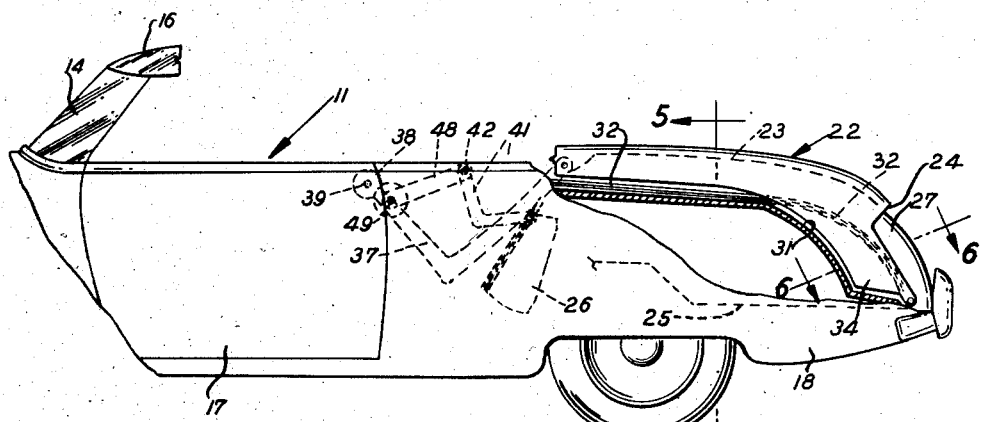
Figure 3 is a side elevational view similar to Figure 2, partly broken away and in section, with the roof and back light in their lowered or stored positions.

Referring now to the drawings, and particularly to Figures 1, 2 and 3, the reference character 11 indicates generally a motor vehicle body incorporating the present invention. The body includes front fenders 12, a hood 13, a self-supporting windshield 14, and a fixed windshield header 16. The side doors 17 and the rear quarter panels 18 are conventional, as well as the front and rear seats 19 and 21 respectively.

Figure 5:
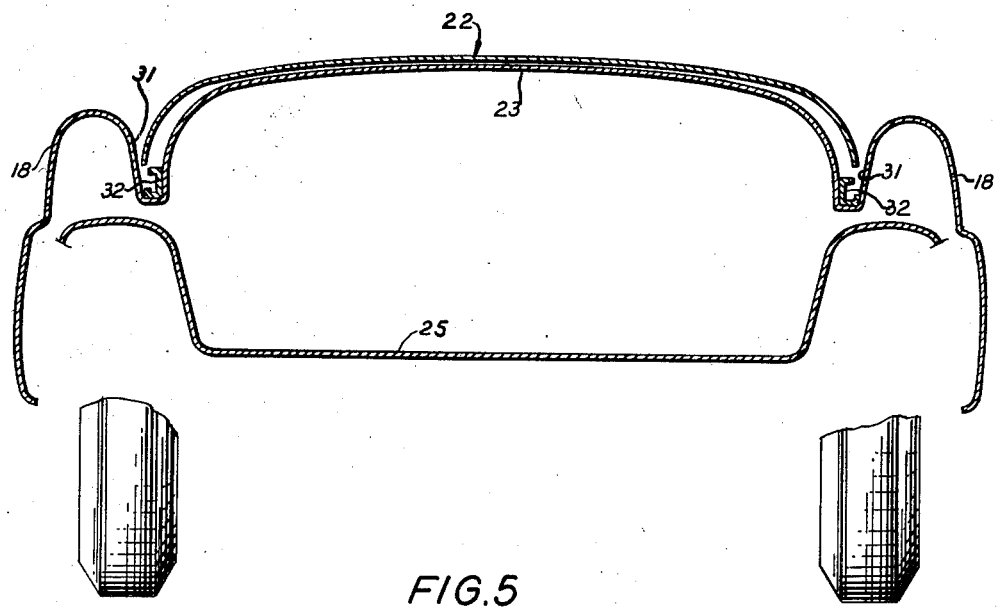
Figure 5 is an enlarged transverse cross sectional view taken on the plane indicated by the line 5—5 of Figure 3.

The roof, however, varies from the conventional convertible or hard top in that it is a rigid one-piece steel roof supported and bodily movable from the raised position shown in Figure 1 to the lowered or stored position shown in Figure 3. In the latter position the roof 22 embraces and is located directly above the fixed rear deck panel 23. Figure 5 illustrates the similarity in shape between the roof 22 and the rear deck panel 23, and it will be apparent that the rearward portion of the vehicle retains a continuity of appearance regardless of whether the roof is up or down.

The rearward portion of the roof 22 is formed with a cut-out portion 24 adapted to receive the back light or rear window 26 when the roof is in its raised position as shown in Figure 1. When the roof is in its lowered position, however, the opening 24 at the rearward end thereof provides clearance for the opening or swinging movement of a luggage compartment door 27. The door 27 is hinged at 28 adjacent its lower portion and swings rearwardly through the opening 24 in the roof to provide access to the storage space between the fixed rear deck panel 23 and the luggage compartment floor 25. Thus, the storage space is accessible whether the roof is up or down.

Figure 4:
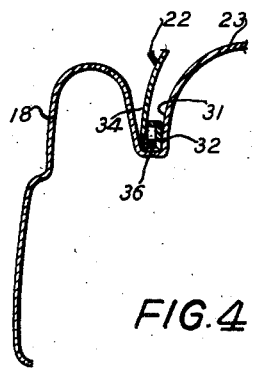
Figure 4 is a fragmentary enlarged transverse cross sectional view taken on the plane indicated by the line 4—4 of Figure 2.
Figure 6:
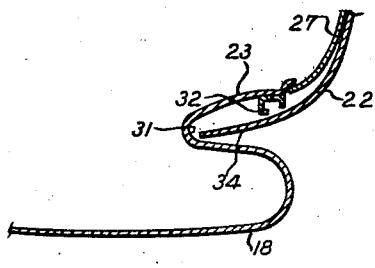
Figure 6 is a fragmentary enlarged cross sectional view taken on the plane indicated by the line 6—6 of Figure 3.

As shown in Figures 4, 5 and 6, the rear deck 23 and the rear quarter panels 18 may be integrally formed if desired, and are so shaped as to provide a longitudinally extending valley or depressed portion 31 therebetween at each side of the vehicle. A generally channel shaped track 32 is positiond in each valley 31, being suitably secured to the adjacent deck panel 23 by welding or other suitable means. As best seen in Figure 3, each track 32 at its forward end is positioned adjacent the bottom of the valley while at its rearward end sweeps somewhat above the bottom of the valley to provide clearance for the downward extending rear side flanges 34 of the roof 22. A roller 36 is mounted upon each of the rear side flanges 34 of the roof and is received within the adjacent channel shaped track 32 for longitudinal sliding movement therein. It will consequently be seen that the tracks 32 guide and support the rearward portion of the roof panel 22 during its movement between its raised and lowered positions.

The forward end of the roof 22 is pivotally supported at each side upon an L-shaped arm 37, the latter being pivotally mounted at its lower end upon the vehicle body structure. In the raised position of the roof as shown in Figure 1, the arm 37 is partially hidden behind the side wall of the roof and the exposed portion simulates a door pillar. At its lower end the arm 37 supports a pinion 39 driven by a suitable power source (not shown) to swing the arm about its pivot 38 to actuate the movement of the roof between its raised and lowered positions.

The back light or rear window 26 is supported at each side by means of an L-shaped arm 41 pivotally connected to the vehicle body at 42 and to the back light frame 43 at 44. In addition, the rearward portion of the back light is provided on each side with a guide or roller 46 slidably mounted in a guide 47 mounted upon the vehicle body. The guide 47 cooperates with the arm in guiding the back light from its raised position in the opening 24 in the roof, as shown in Figure 1, to a position rearwardly of the rear seat 21. The arm 41 is actuated by means of a chain or belt connection 48 from a pulley or pinion 49 mounted upon the vehicle body and driven from the pinion 39 so that the back light will be raised and lowered in timed relationship to the raising and lowering of the roof. It is understood, however, that the present invention contemplates other means for supporting and actuating the back light as well as the roof panel.

It will be understood that the invention is not to be limited to the exact construction shown and described, but that various changes and modifications may be made without departing from the spirit and scope of the invention, as defined in the appended claims.

What is claimed is:

1. In a motor vehicle having a conventional operator's position the improvement comprising a top, said top having a rearward portion slidably engaged on either side of the motor vehicle so that upon directional urging of a forward part of said top, said rearward portion will correspondingly move, said roof being engageable with a roof receiving member attached to a nonretractable portion of said vehicle, a support arm, said arm being pivotable at one end to a body portion of said motor vehicle intermediate the forwardmost and rearwardmost roof portions when said roof is in a raised position, said arm when said roof is in a raised position extending generally upwardly from said pivot to a point above said operator's position with said upwardly extending portion being rearwardly of said operator position, said upwardly extending portion thence extending in a generally forwardly direction to a forward roof portion with said arm being attached to said forward roof portion whereby the forwardmost roof portion describes a lower arc in moving between a raised and lowered position and a more horizontal force during roof operation is applied to said rearward portion thereby reducing sliding resistance of said slidable rearward portion.

2. The improvement claimed in claim 1 with said motor vehicle body having generally vertically extending rear quarter panels at each side of said body, a fixed deck panel extending transversely between said rear quarter panels and joined thereto, a luggage compartment floor extending generally horizontally intermediate said rear quarter panels and beneath said deck panel to provide storage space therebetween, said deck panel at its rearward portion terminating a substantial distance above said floor panel to provide an opening therebetween to afford access to the storage space, a luggage compartment door pivotally connected to said body and closing said opening, and said roof having a transversely extending opening in its rearward portion coinciding generally with the opening in the deck panel when the roof is in its retracted position to enable the luggage compartment door to be opened and closed regardless of whether the roof is raised or retracted, a retractable rear window corresponding in size to the size of the opening in the rearward portion of said roof is provided to close said last mentioned opening when the roof is raised, means supporting and guiding said rear window for movement between a raised position and a retracted position within the vehicle body, and means interconnecting the roof and rear window guiding and supporting means to require movement of the roof and rear window between their raised and retracted positions in timed relationship to each other.

References Cited in the file of this patent

UNITED STATES PATENTS

| 1,722,227 | Lukesh | July 23, 1929 |
| 2,007,873 | Paulin | July 9, 1935 |
| 2,051,140 | Grimston | Aug. 18, 1936 |
| 2,234,040 | Carr | Mar. 4, 1941 |
| 2,471,378 | Shilala | May 24, 1949 |
| 2,575,864 | Croucher | Nov. 20, 1951 |
| 2,623,779 | Catell | Dec. 30, 1952 |

FOREIGN PATENTS

| 500,588 | Belgium | Jan. 31, 1951 |
| 645,493 | Germany | May 29, 1937 |
| 445,188 | Great Britain | Apr. 3, 1936 |
| 448,042 | Great Britain | May 29, 1936 |
| 612,015 | Great Britain | Nov. 8, 1948 |